United States Patent
Lim

(10) Patent No.: US 7,599,487 B2
(45) Date of Patent: Oct. 6, 2009

(54) SLIDING TYPE HINGE DEVICE AND PERSONAL PORTABLE DEVICE USING THE SAME

(75) Inventor: Yong Ho Lim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 511 days.

(21) Appl. No.: 11/479,567

(22) Filed: Jun. 30, 2006

(65) Prior Publication Data

US 2007/0123179 A1    May 31, 2007

(30) Foreign Application Priority Data

Nov. 11, 2005    (KR)    ............... 10-2005-0107924

(51) Int. Cl.
*H04M 1/00* (2006.01)
*H04M 9/00* (2006.01)

(52) U.S. Cl. ............... 379/433.12; 379/433.13; 455/575.4

(58) Field of Classification Search ............ 379/428.01, 379/433.01, 433.11, 433.12, 433.13; 455/90.3, 455/575.1, 575.3, 575.4; 16/289
See application file for complete search history.

(56) References Cited

U.S. PATENT DOCUMENTS

2006/0160584 A1* 7/2006 Lee et al. ............... 455/575.4

FOREIGN PATENT DOCUMENTS

| JP | 2005-061559 | 3/2005 |
| JP | 2007-074411 | 3/2007 |
| KR | 10-2004-0062131 | 7/2004 |
| KR | 10-2005-0056609 | 6/2005 |
| KR | 10-2005-0070220 | 7/2005 |

* cited by examiner

*Primary Examiner*—Tuan D Nguyen
(74) *Attorney, Agent, or Firm*—H.C. Park & Associates, PLC

(57) ABSTRACT

There is provided a slide hinge device for guiding a slide of a slide part on a main part. The slide hinge device includes: a slide hinge unit installed in the rear of the slide part, for guiding a slide of the slide part; a fixed hinge unit installed in the front of the main part; and a lift hinge unit rotatably installed to the fixed hinge unit and engaged with the slide hinge unit to guide a slide of the slide hinge unit. In the case the slide part is opened, the lift hinge unit rotates to the fixed hinge unit and raises the slide part to be slanted towards the main part, thereby enabling a microphone and a receiver of a personal portable device to be close to the mouth and an ear of a user, respectively.

17 Claims, 14 Drawing Sheets

SLIDING TYPE HINGE DEVICE AND PERSONAL PORTABLE DEVICE USING THE SAME

CROSS-REFERENCE TO RELATED APPLICATIONS

This application claims the benefit of Korean Patent Application No. 10-2005-0107924, filed on Nov. 11, 2005, in the Korean Intellectual Property Office, the disclosure of which is incorporated herein in its entity by reference.

BACKGROUND OF THE INVENTION

1. Field of the Invention

The present invention relates to a personal digital device, and more particularly, to a personal portable device and a slide hinge thereof, in which a microphone and a receiver of a slide type terminal are disposed close to the mouth and an ear, respectively.

2. Description of the Related Art

Generally, there are flip type, swing type, folder type, and slide type personal digital devices.

In the flip type, a display unit such as an LCD and a key input unit are formed in a single body and the key input unit is protected by using a cover connected to a lower end by a hinge.

In the folder type, two folder parts are connected to each other by a hinge to be open and closed and a main display unit and a key input unit are formed on surfaces opposite to each other. In a personal portable device of the folder type, a display unit and a key input unit may be protected by closing the two folder parts and operations of answering a call or inputting by using keys may be performed by opening the folder parts.

In a personal portable device of the swing type, two main bodies of a terminal are disposed to be opposite to each other and one of the two main bodies maintains a state of being parallel to the other main body while rotating through 180 degrees and moving. The described type designates a swing type personal portable device and a position of each of the main bodies of the terminal may be designated, thereby making this type currently popular.

Finally, in a personal portable device of the slide type, two slide parts are mutually overlapping and a display unit and a key input unit are disposed in the slide parts to face the same direction. Generally, in the personal portable device of the slide type, a covered display unit or key input unit of the rear side may be exposed by sliding a front slide part.

FIG. 1 is a perspective view illustrating a conventional slide type terminal in an opened state, and FIG. 2 is a diagram illustrating an example of using the slide type terminal of FIG. 1.

Referring to FIGS. 1 and 2, a conventional slide type terminal 1 includes a main part 10 and a slide part 20. The slide part 20 vertically slides on the main part 10 and performs the functions of opening/closing a keypad and answering a phone call.

An antenna for wirelessly transmitting and receiving is installed in the main part 10, and a microphone 15 for inputting a voice is built in a lower end. Also, corresponding to the microphone 15, a speaker or a receiver 25 for outputting a voice of a person on the other end of the line is built in a front upper end of the slide part 20.

In the portable terminal formed of a conventional structure as described above, the slide part 20 moves straight relative to the main part 10, in the case of calling and the slide part 20 is upwardly open, and if the receiver 25 of the slide part 20 is held close to an ear of a user, the microphone 15 of the main part 10 becomes far from the mouth of the user, thereby dropping the quality of communication. Similarly, if the microphone 15 of the main part 10 is held close to the mouth of the user, the receiver 25 of the slide part 20 becomes far from the ear of the user, thereby also dropping the quality of communication.

SUMMARY OF THE INVENTION

To solve the described problems, the present invention provides a personal portable device and a slide hinge device thereof, in which a microphone of a main part can be held close to the mouth of the user while a receiver of a slide part is held close to the ear of the user.

The present invention also provides a personal portable device and a slide hinge device thereof, including a safety means capable of blocking and protecting the inside of the personal portable device though a slide part is moved relative to a main part.

According to an aspect of the present invention, there is provided a slide hinge device including a slide hinge unit installed in the rear of the slide part, for guiding a slide of the slide part; a fixed hinge unit installed in the front of the main part; and a lift hinge unit rotatably installed on the fixed hinge unit and engaged with the slide hinge unit to guide the slide of the slide hinge unit. Since the lift hinge unit of the slide hinge device can rotate on the fixed hinge unit in contrast with a conventional slide hinge device only capable of vertical movement, it is possible to raise the slide part to be slanted towards the main part after moving the slide part.

Since the slide part and the main part mutually interfere with each other, the lift hinge unit may not rotate while the slide part is closed or is moving. The lift hinge unit may be free from interference of both bodies only when the slide part is opened, and then the lift hinge unit may rotate to the fixed hinge unit and raises the slide part to be slanted towards the main part. In this case, an axis connecting the lift hinge unit with the fixed hinge unit may be formed in an upper end or lower end of the fixed hinge unit.

In a state in which the slide hinge unit is moved to be located at the upper end or lower end, namely when the slide part is opened, the lift hinge unit may rotate to the fixed hinge unit, thereby maintaining a state in which the slide part is lifted from and slanted to the main part. Accordingly, though a receiver of the slide part is close to an ear, a microphone of the main part may be held closer to the mouth.

In the present specification, a personal portable device may be used as a commonly known concept of a terminal which is a portable electrical/electronic device such as a personal computer, a handheld computer, a Personal Digital Assistant (PDA), an MP3 player, an electronic dictionary, a mobile phone, and a smart phone, may include a Code Division Multiple Access (CDMA) module, a Bluetooth module, an infrared communication module (IrDA), a wired or wireless LAN card, and has predetermined operation ability by including a predetermined microprocessor executing multimedia playback functionality.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
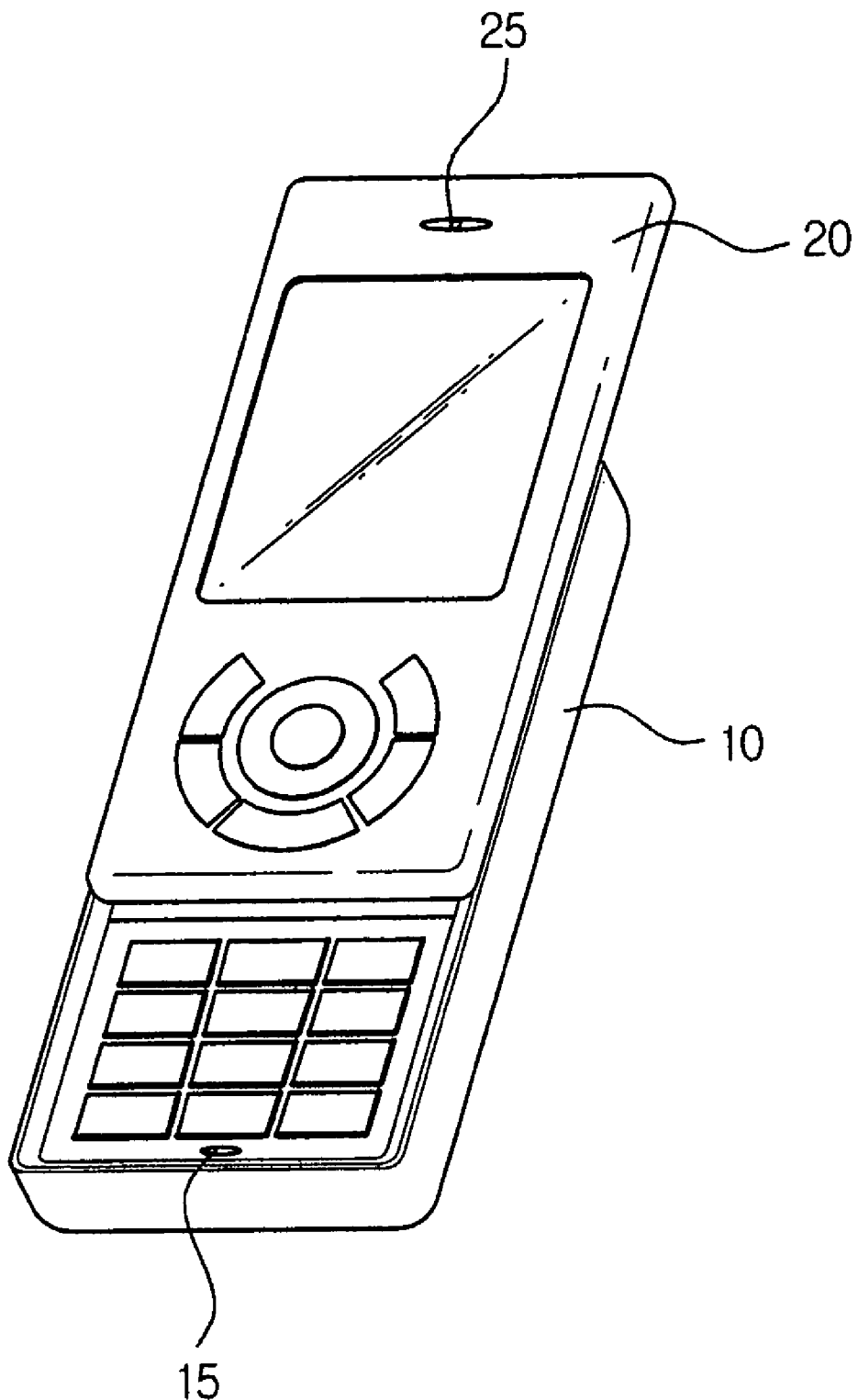
FIG. 1 is a perspective view illustrating a conventional slide type terminal in an opened state.
Figure 2:
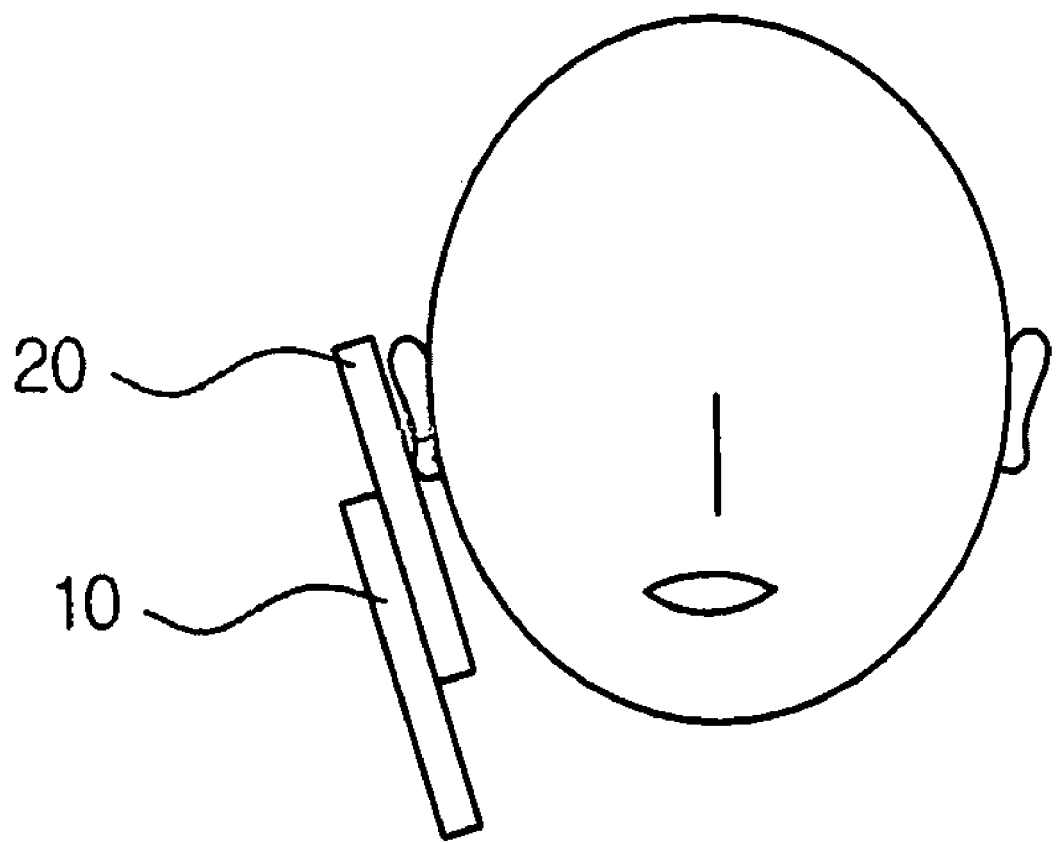
FIG. 2 is a diagram illustrating an example of using the slide type terminal of FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
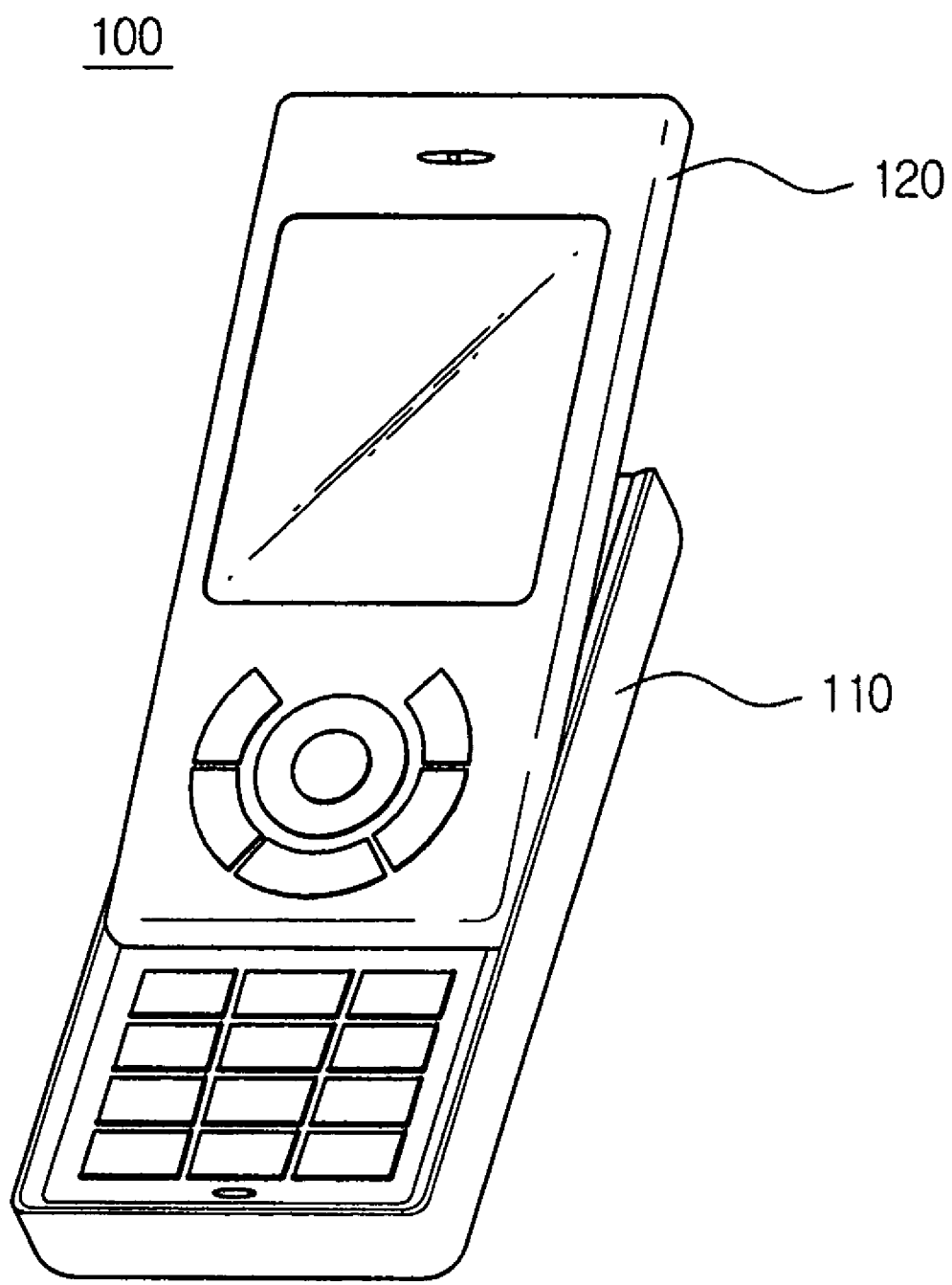
FIG. 3 is a perspective view illustrating a state of opening and lifting a personal portable device according to an embodiment of the present invention.
Figure 4:
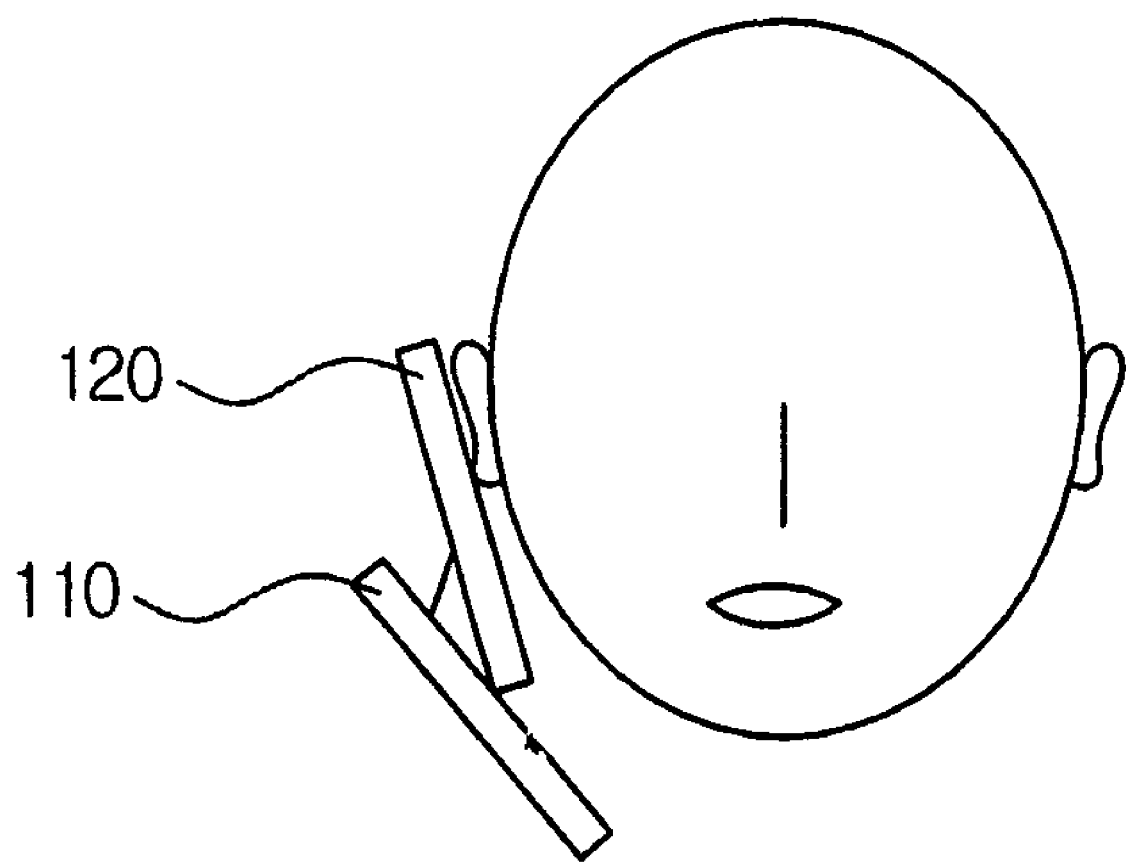
FIG. 4 is a diagram illustrating an example of using the personal portable device of FIG. 3.

FIG. 3 is a perspective view illustrating a personal portable device 100 in an opened and raised state according to an embodiment of the present invention, and FIG. 4 is a diagram illustrating an example of using the personal portable device 100 of FIG. 3.

Referring to FIGS. 3 and 4, the personal portable device 100 includes a main part 110 and a slide part 120. The slide part 120 may vertically slide on the main part 110. Also, in the case the slide part 120 moves to an upper end, the slide part 120 may be raised and slanted towards the main part 110.

As described later, a slide hinge device is installed between the slide part 120 and the main part 110. A slide hinge device according to the present embodiment may guide the slide part 120 to not only vertically move but also rotate around a lower end of the slide part 120.

As illustrated in FIG. 4, the slide part 120 and the main part 110 may be folded at a predetermined angle, and a user may hold a receiver and a microphone close to an ear and the mouth, respectively.

In the present embodiment, while a slide part moves above a main part and is maintained to be open, the slide part rotate on the upper end of the main part at the end of the movement path. However, the slide part may move downward to the main part and may rotate on the lower end of the main part at the end of the movement path. Those skilled in the art may easily manufacture a terminal and a slide hinge device sliding in the opposite direction by applying the slide hinge device structure that will be described later.

Figure 5:
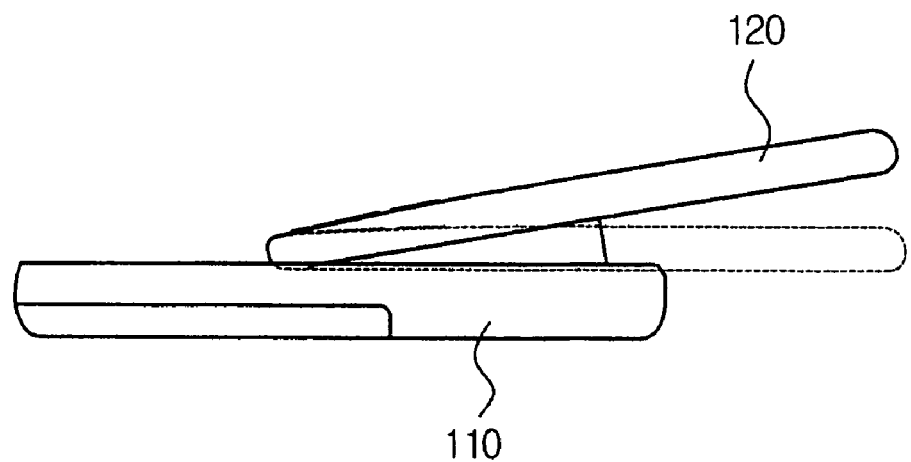
FIG. 5 is a side view illustrating a state of operating the personal portable device of FIG. 3.

FIG. 5 is a side view illustrating the personal portable device of FIG. 3 in an operating state.

Referring to FIG. 5, the slide part 120 may vertically slide on the main part 110 and may be raised to be slanted towards the main part 110 in the case the slide part 120 is located in the upper end. In the case the slide part 120 is located in the lower end, since a lower end portion of the slide part 120 is supported by the main part 110, the slide part 120 cannot rotate. In the case the slide part 120 is located in the upper end, since the main part 110 no longer supports the lower end portion of the slide part 120, the slide part 120 may be raised.

Figure 6:
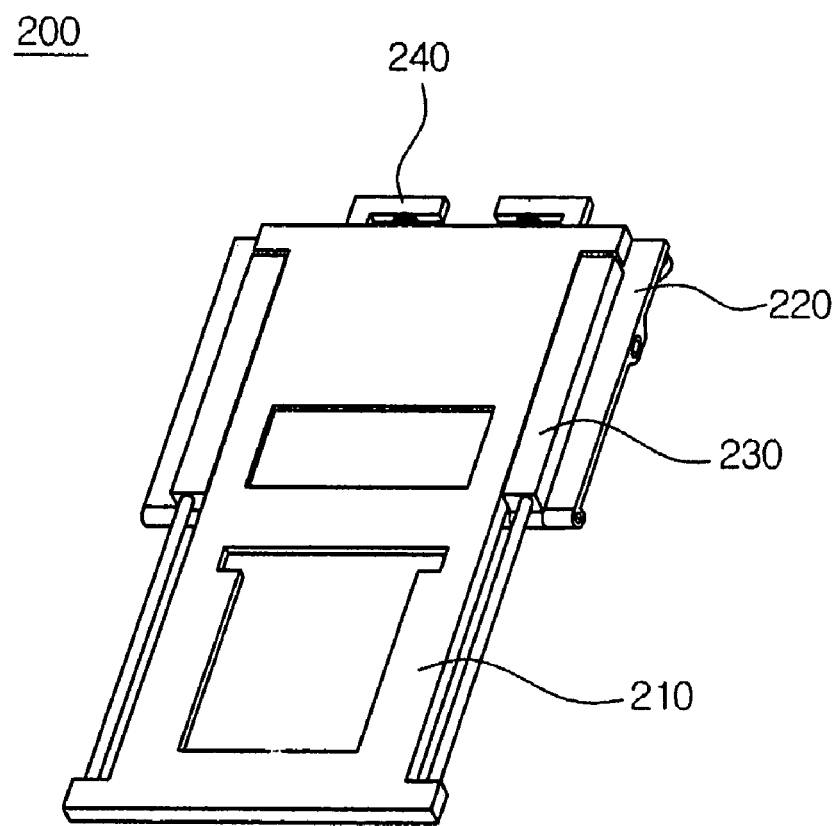
FIG. 6 is a perspective view illustrating a slide hinge device of the personal portable device of FIG. 3 in a closed state.
Figure 7:
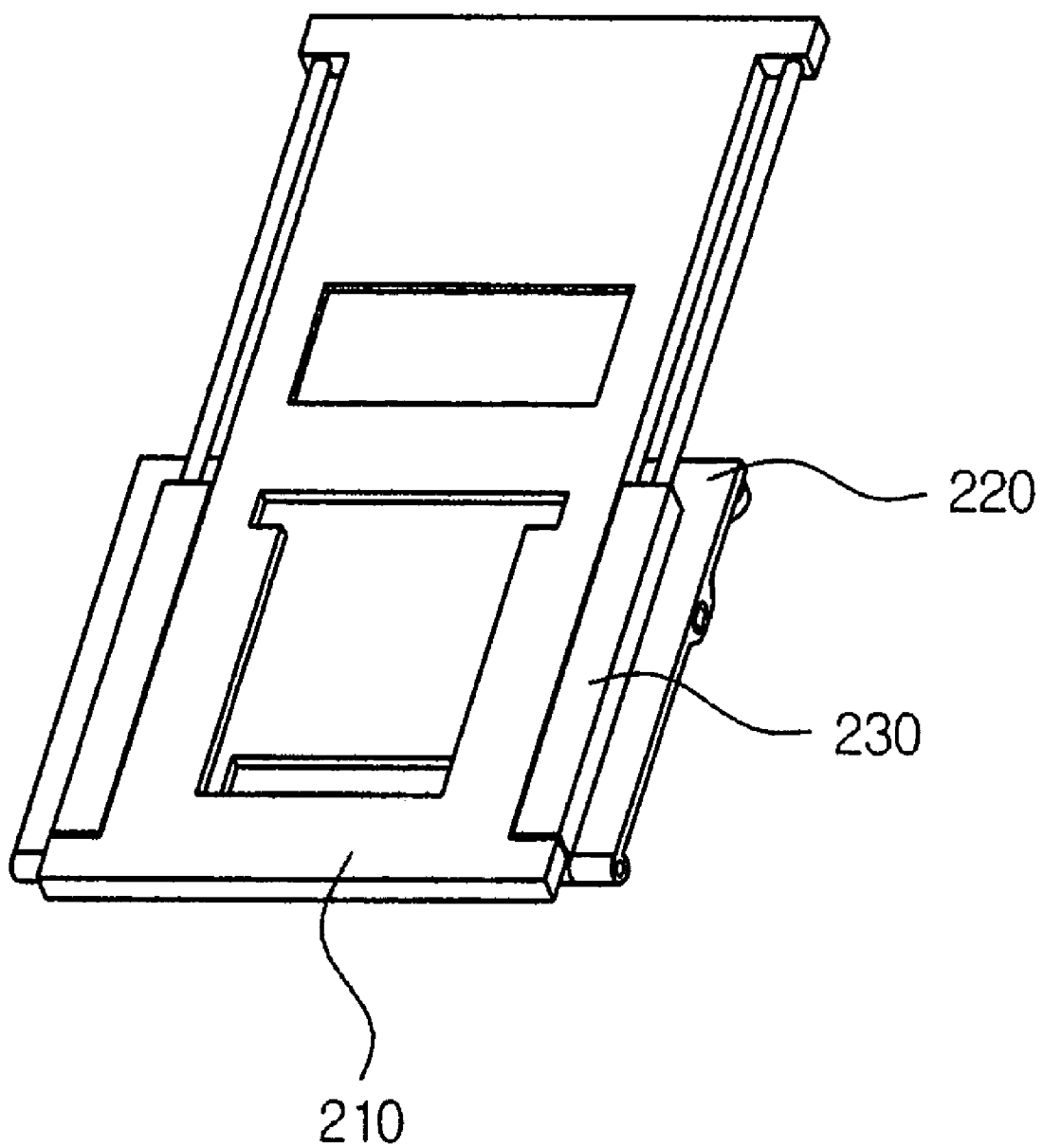
FIG. 7 is a perspective view illustrating the slide hinge device of the personal portable device of FIG. 3 in an opened state.
Figure 8:
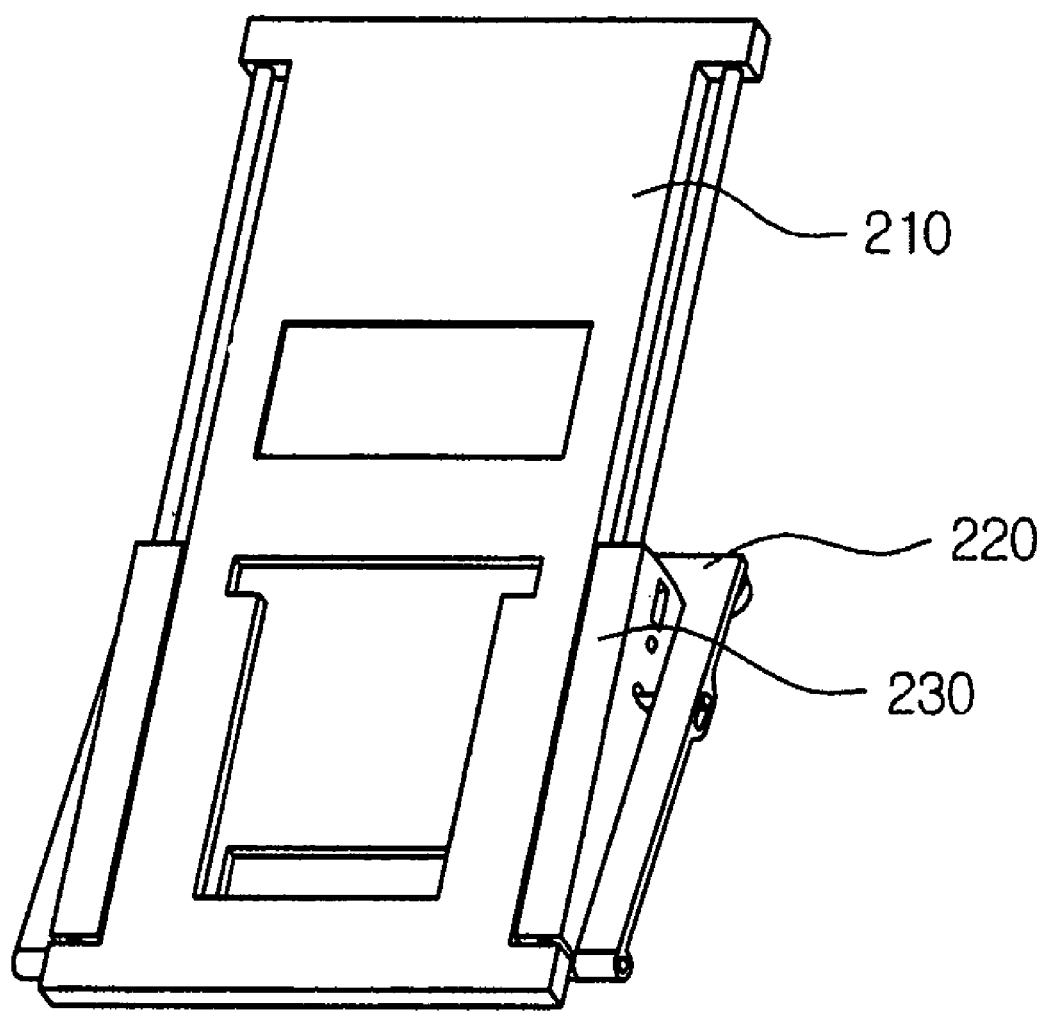
FIG. 8 is a perspective view illustrating the slide hinge device of the personal portable device of FIG. 3 in a raised state.
Figure 9:
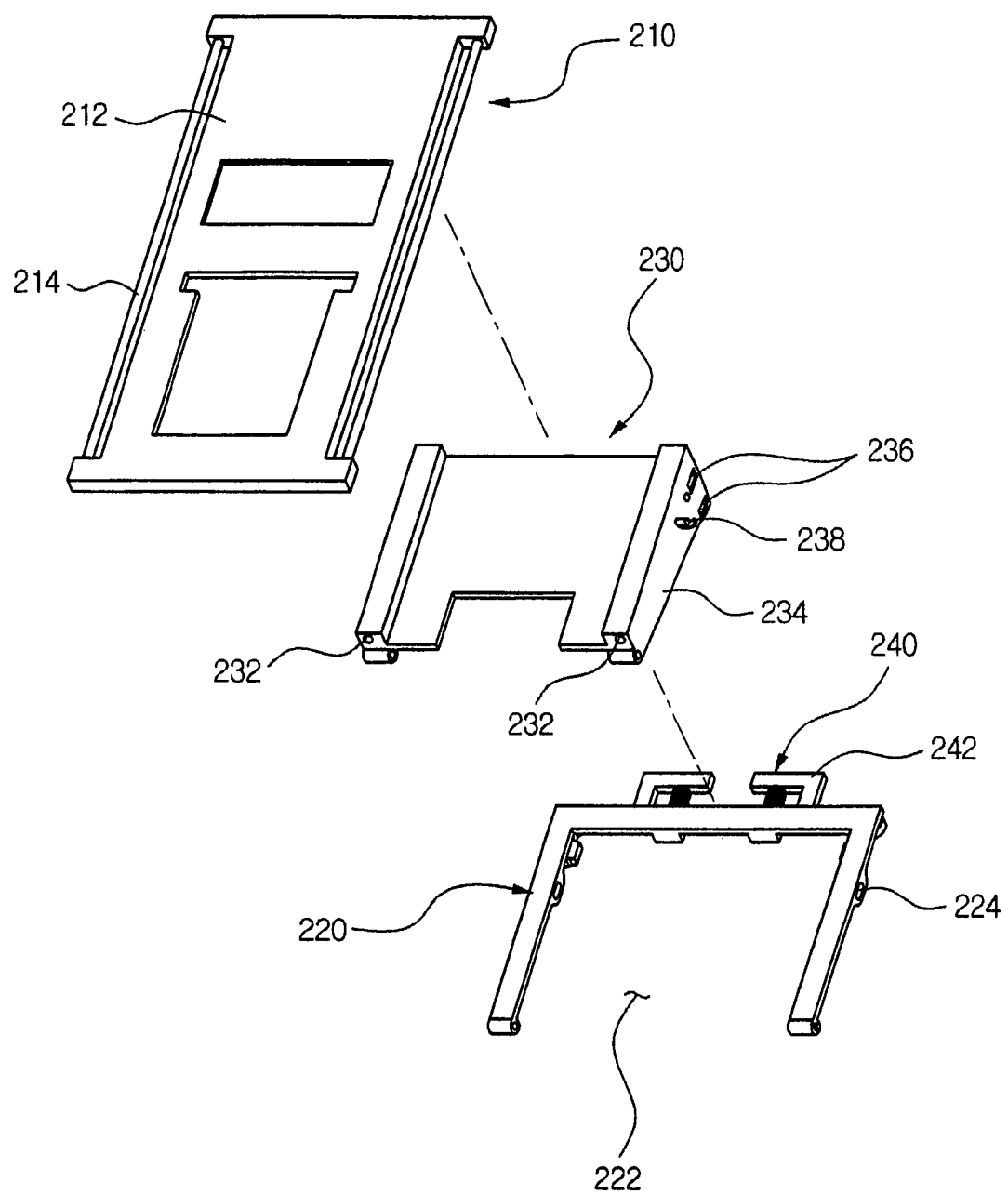
FIG. 9 is an exploded perspective view illustrating the slide hinge device of FIGS. 6 through 8.

FIG. 6 is a perspective view illustrating a slide hinge device of the personal portable device of FIG. 3 in a closed state, FIG. 7 is a perspective view illustrating the slide hinge device in an opened state, FIG. 8 is a perspective view illustrating the slide hinge device of the personal portable device of FIG. 3 in a raised state, and FIG. 9 is an exploded perspective view illustrating the slide hinge device of FIGS. 6 through 8.

Referring to FIGS. 6 and 9, the slide hinge device 200 includes a slide hinge unit 210, a fixed hinge unit 220, a lift hinge unit 230, and a stop member 240. The slide hinge unit 210 is installed in the rear of the slide part 120 of FIG. 5. The fixed hinge unit 220 is installed in the front of the main part 110. The lift hinge unit 230, rotatably installed to rotate on a horizontal axis, which is perpendicular to a sliding direction of the sliding hinge unit 210, is placed in both lower ends of the fixed hinge unit 220. The slide hinge unit 210 is engaged with the lift hinge unit 230 to slide reciprocatingly along a straight path under a guide of the lift hinge unit 230. Considering the structure of the slide hinge device 200, the slide hinge unit 210 and the lift hinge unit 230 may rotate on the fixed hinge unit 220. However, due to physical interference between the slide part 120 and the main part 110 where the slide hinge device 200 is installed, the slide hinge unit 210 and the lift hinge unit 230 may rotate on the fixed hinge unit 220 only in the case the slide part 120 is open, and may raise the slide part 120 to be slanted towards the main part 110.

The slide hinge unit 210 includes a plate 212 installed in the rear of the slide part 120 and a guide portion 214 longitudinally formed on both sides of the plate 212. The guide portion 214 may be formed in the shape of a protrusion or a bar and is vertically provided in both sides of the plate 212. The lift hinge unit 230 has a holding structure for containing the both sides of the plate 212 and includes a slide guide groove 232 formed at the holding structure for containing the guide portion 214. Accordingly, the slide hinge unit 210 may reciprocatingly move along a certain straight path defined by the guide portion 214 and the slide guide groove 232.

The fixed hinge unit 220, approximately formed in the shape of "Π", provides a hinge containing space 222, which is open downward, and permanently installed in the front of the main part 110. The lift hinge unit 230 is disposed in the hinge containing space 222 and rotatably engaged with both ends of the fixed hinge unit 220, thereby rotate back and forth in the hinge containing space 222.

Referring to FIG. 9, the lift hinge unit 230 includes a lift sideboard 234 formed in the shape of a fan and provided on a side on the horizontal axis. Two stop holes 236 corresponding to both ends of a movement path of the lift hinge unit 230 are formed in the lift sideboard 234. Also, an arc slit 238 is formed in the lift sideboard 234, adjacent to the stop holes 236. The stop holes 236 are used to maintain the lift hinge unit 230 in an opened or closed state. The arc slit 238 is used in relation with a slant board that will be described later.

The guide portion 214 formed in the shape of a bar is provided in the both sides of the plate 212 and may guide the movement of the slide hinge unit 210 by moving according to a hole or groove formed in the lift hinge unit 230. Also, the lift hinge unit 230 is disposed in the hinge containing space 222 and may vertically move on the horizontal axis, and the stop member 240 may maintain the lift hinge unit 230 to be in an opened or closed state.

Figure 10:
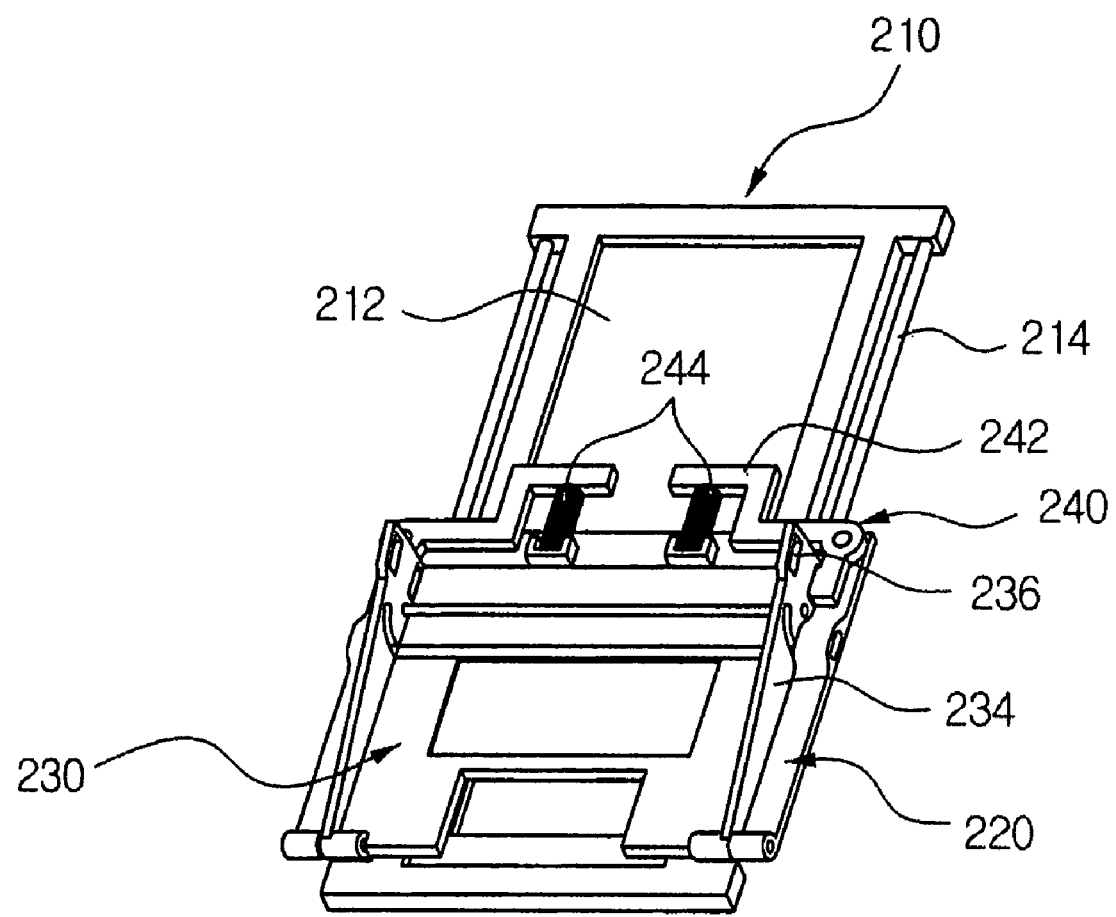
FIG. 10 is a rear perspective view illustrating the slide hinge device of FIGS. 6 through 8.

FIG. 10 is a rear perspective view illustrating the slide hinge device of FIGS. 6 through 8.

Referring to FIG. 10, a stop member 240 is installed in an upper end of the rear of the fixed hinge unit 220. The stop member 240 is selectively engaged with the lift hinge unit 230 to install the lift hinge unit 230 on the fixed hinge unit 220. The stop member 240 includes a stop lever 242 and a spring 244. Also, the stop lever 242 and the spring 244 are symmetrically formed to be simultaneously engaged with or released from the both lift sideboards 234.

The stop lever 242 is formed in the shape of stairs and may be selectively engaged with the stop holes 236. A protrusion is formed in one end corresponding to the stop hole 236 to be engaged with the stop hole 236. The other end is supported by the spring 244 to provide a force for closely attaching the one end including the protrusion to the lift sideboard 234. The stop lever 242 may be formed in the shape of a stair or two stairs.

Figure 11:
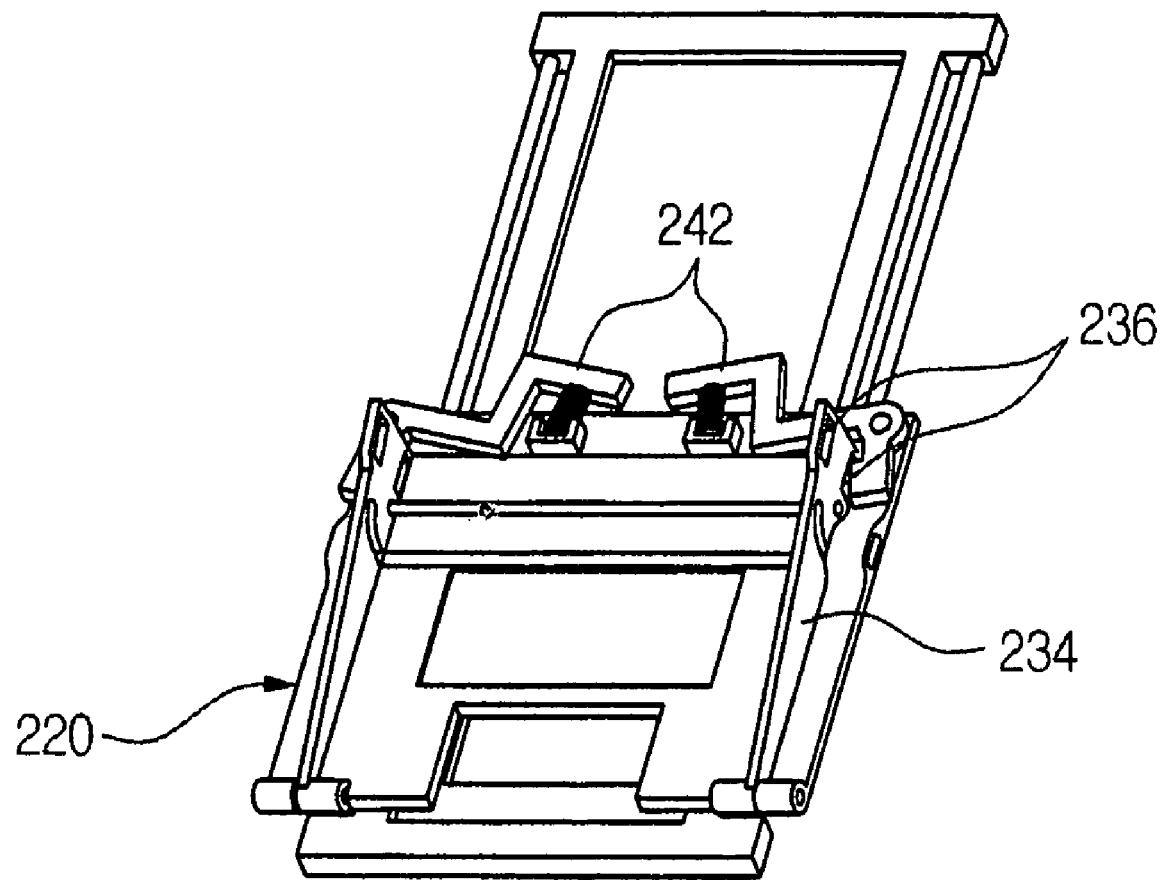
FIGS. 11 and 12 are perspective views illustrating the operation of the slide hinge device of FIG. 10.
Figure 12:
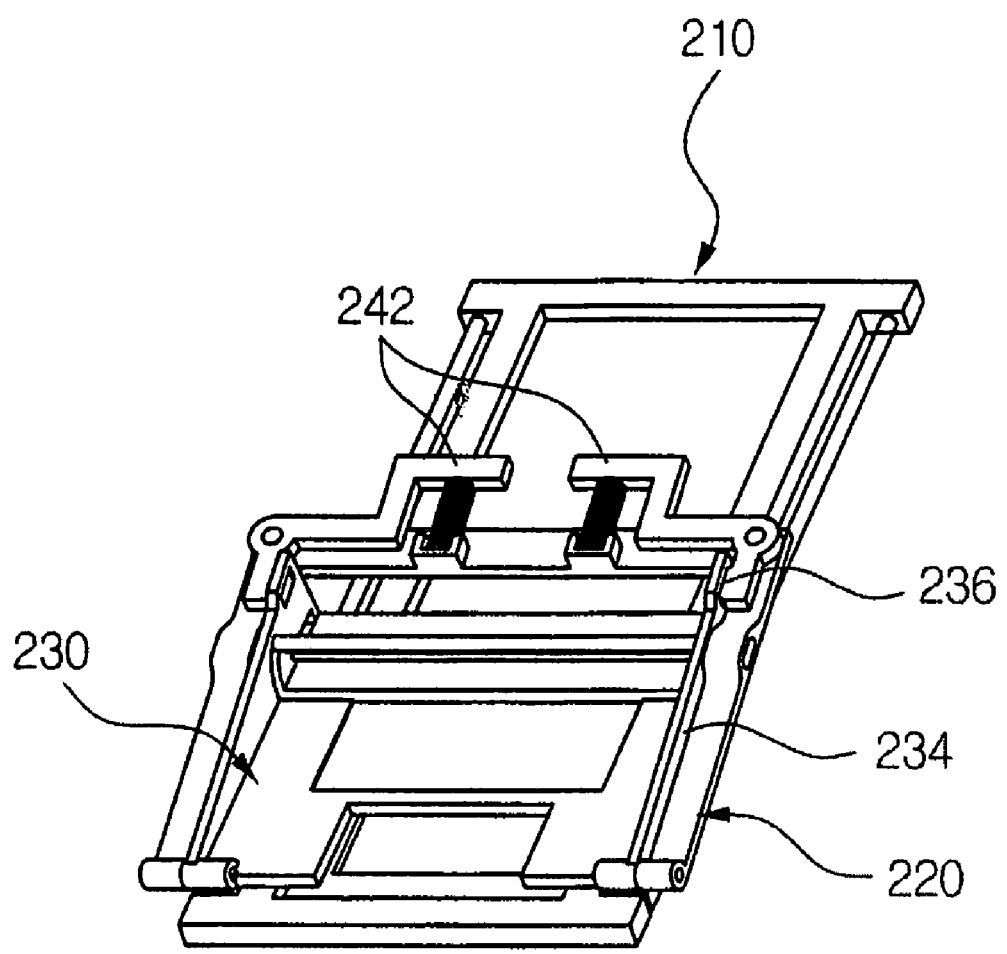
Figure 13:
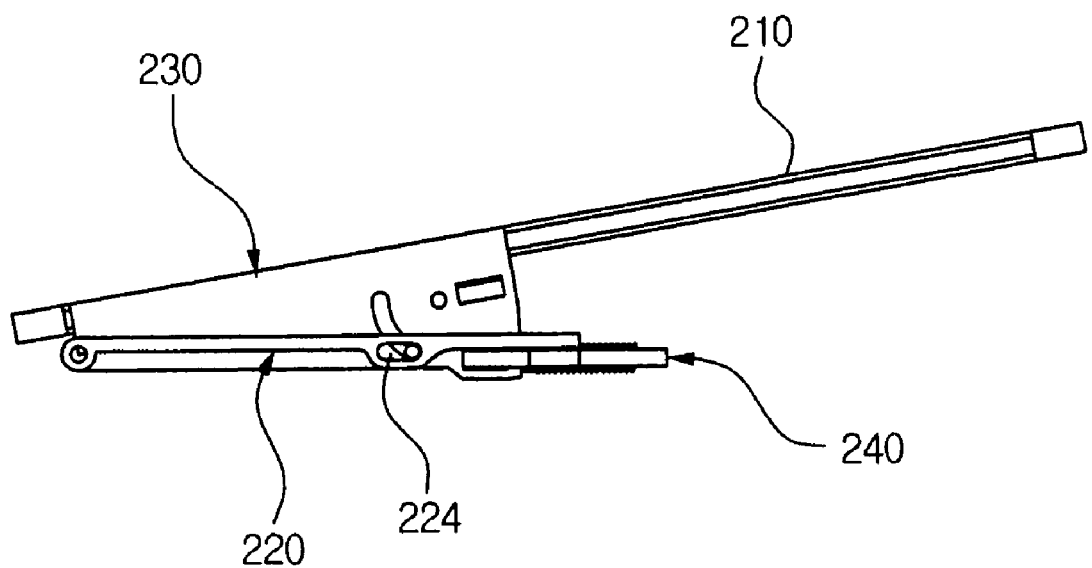
FIG. 13 is a side view illustrating the slide hinge device in a raised state.
Figure 14:
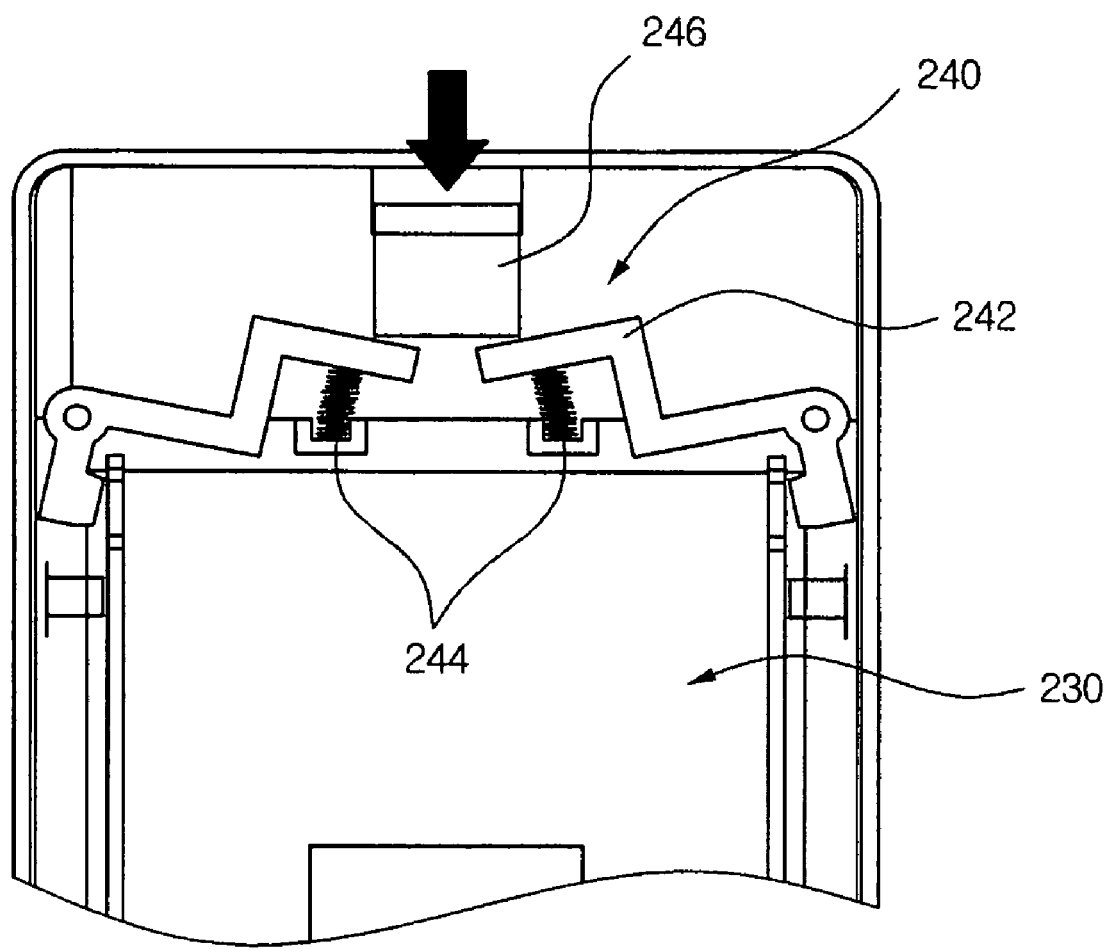
FIG. 14 is a rear view illustrating the operation of a stop lever.

FIGS. 11 and 12 are perspective views illustrating the operation of the slide hinge device of FIG. 10, FIG. 13 is a side view illustrating a state of raising the slide hinge device, and FIG. 14 is a rear view illustrating the operation of a stop lever.

Referring to FIGS. 11 through 14, the user may push the stop lever 242 via an external button 246, and the stop lever 242 rotates such that the protrusion of the one end is separated from the stop hole 236. In this case, the lift hinge unit 230 rotates on the fixed hinge unit 220 and the slide hinge unit 210, so that the slide part may be raised.

After the lift hinge unit 230 moves up, the stop holes 236 disposed below is located corresponding to a position of the protrusion of the stop lever 242 and the stop lever 242 returns to a original position and maintains the lift hinge unit 230 to be engaged in the case the user releases the button 246.

Figure 15:
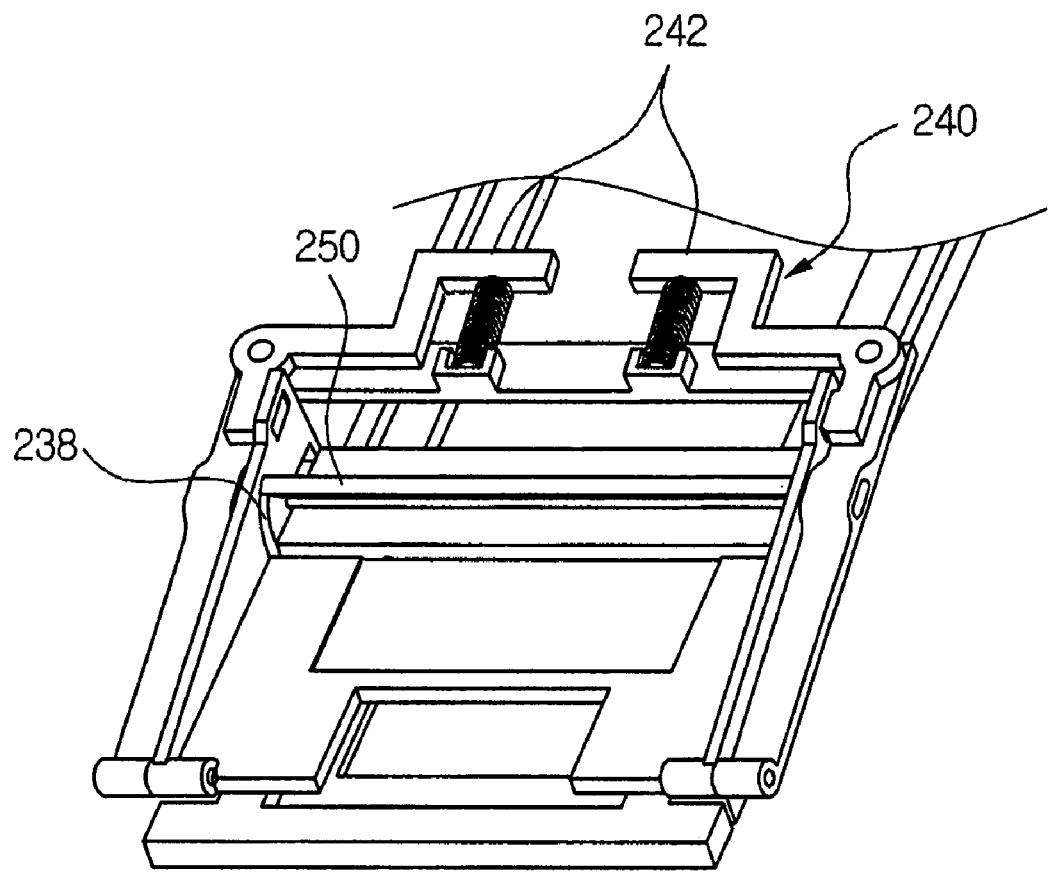
FIG. 15 is a rear perspective view illustrating a slide hinge device according to an embodiment of the present invention.

FIG. 15 is a rear perspective view illustrating a slide hinge device according to one embodiment of the present invention.

Referring to FIG. 15, a slant board 250 for blocking a gap between the lift hinge unit 230 and the fixed hinge unit 220 is provided. Both ends of one edge of the slant board 250 are rotatably installed on the lift hinge unit 230, and both ends of the other edge are rotatably installed on the fixed hinge unit 220 to be capable of sliding or rotated. In detail, a protrusion protruded outwardly is formed on the both ends of the other edge of the slant board 250, and grooves 224 (see FIG. 9), formed in the shape of a slit for containing each of the protrusions, are formed in the fixed hinge unit 220. Accordingly, the slant board 250 may slide and rotate on the fixed hinge unit 220. Also, the arc slits 238, formed corresponding to the movement of the protrusions, are formed in the lift sideboard 234. The arc slits 238 are provided not to prevent the movement of the protrusions, and the protrusion may pass the arc slit 238 and may maintain being engaged with the groove 224 of the fixed hinge unit 220.

The lift hinge unit 230 is raised from the fixed hinge unit 220, and the slant board blocks the gap between the lift hinge unit 230 and the fixed hinge unit 220 and the lift sideboard 234 blocks a side portion thereof.

The slide hinge device according to the present invention may raise the slide hinge unit to be slanted by using the lift hinge unit, thereby enabling the microphone of the main part to be held close to the mouth while the receiver of the slide part is held closely to an ear.

Also, though the slide part moves on the main part, the inside may be safely blocked and protected by using the slant board.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A slide hinge device for guiding a slide of a slide part on a main part in a portable communication device, comprising: a slide hinge unit installed in the rear of the slide part, for guiding the slide of the slide part; a fixed hinge unit installed in the front of the main part; a lift hinge unit rotatably installed on the fixed hinge unit and engaged with the slide hinge unit to guide the slide of the slide hinge unit, and a stop lever capable of being engaged with one of the stop holes installed in the fixed hinge unit, an end portion of the stop lever to be selectively inserted into one of the stop holes and maintains the lift hinge unit to be raised, wherein, when the slide part is opened, the lift hinge unit rotates to the fixed hinge unit and raises the slide part to be slanted towards the main part, and wherein the lift hinge unit includes a lift sideboard on a side of the lift hinge unit and a plurality of stop holes is formed in the lift sideboard, is formed in the shape of a fan, corresponding to the movement of the lift hinge unit.

2. The slide hinge device of claim 1, wherein:
the slide hinge unit includes a plate installed in the rear of the slide part and a guide portion longitudinally formed on both sides of the plate; and
the lift hinge unit includes a slide guide groove containing the guide portion and guides the slide of the slide hinge unit.

3. The slide hinge device of claim 1, wherein:
the stop lever is formed in the shape of stairs and installed in the top of the fixed hinge unit, to be rotated;
a protrusion is formed on one end portion of the stop lever corresponding to the stop hole; and
the other end portion of the stop lever is supported by a spring to make the protrusion press against the lift sideboard.

4. The slide hinge device of claim 1, wherein:
a slant board for blocking a gap between the lift hinge unit and the fixed hinge unit is provided;
both ends of one edge of the slant board are installed in the lift hinge unit, to be rotated;
both ends of another edge opposite to the one edge are installed in the fixed hinge unit, to be slid and rotated; and
the lift hinge unit is raised from the fixed hinge unit and the slant board blocks the gap between the lift hinge unit and the fixed hinge unit.

5. The slide hinge device of claim 4, wherein:
protrusions are outwardly formed in both ends of the another edge of the slant board, respectively;
grooves are formed in the shape of a slit, for containing each of the protrusions, in the fixed hinge unit; and
the another edge of the slant board is slid and rotated in the fixed hinge unit.

6. The slide hinge device of claim 5, wherein:
the lift hinge unit includes two lift sideboards, formed in the shape of a fan, on both sides thereof;

arc slits formed corresponding to the movement of the protrusions are formed in the lift sideboard; and the protrusions pass through the arc slits and maintain to be engaged with the fixed hinge unit, respectively.

7. A slide hinge device for guiding a slide of a slide part on a main part in a portable communication device, comprising:
a slide hinge unit including a plate installed in the rear of the slide part and a guide portion longitudinally formed on both sides of the plate;
a fixed hinge unit installed in the front of the main part and forming a hinge containing space to be open downwardly;
a lift hinge unit rotatably installed on the fixed hinge unit to rotate in the hinge containing space on a horizontal axis placed in both lower ends of the hinge containing space, the lift hinge unit including a slide guide groove for guiding the slide of the guide unit and a lift sideboard, formed in the shape of a fan, on a side based on the horizontal axis; and
a stop member selectively engaged with the lift hinge unit to fasten the lift hinge unit to the fixed hinge unit, wherein, when the slide part is open, the lift hinge unit rotates to the fixed hinge unit and raises the slide part to slant towards the main part, and the stop member maintains the raised lift hinge unit to be stopped.

8. The slide hinge device of claim 7, wherein:
two stop holes are formed in the lift sideboard corresponding to two end points of the movement of the lift hinge unit;
the stop member includes a stop lever selectively engaged with one of the stop holes; and
the stop lever is rotatably installed in the fixed hinge unit, such that a part of one end of the stop lever is inserted into one of the stop holes and the other end of the stop lever is elastically supported by a spring for pressing.

9. The slide hinge device of claim 8, wherein:
the stop lever is formed in the shape of stairs and installed on the top of the fixed hinge unit to be rotated; and
a protrusion is formed on one end corresponding to the stop holes and engaged with one of the stop hole.

10. The slide hinge device of claim 7, wherein:
a slant board for blocking a gap between the lift hinge unit and the fixed hinge unit is provided;
both ends of one edge of the slant board are installed in the lift hinge unit to be rotated;
both ends of another edge opposite to the one edge are installed in the fixed hinge unit to be slid or rotated;
the lift hinge unit is raised from the fixed hinge unit; and
the slant board blocks the gap between the lift hinge unit and the fixed hinge unit.

11. The slide hinge device of claim 10, wherein:
protrusions are outwardly formed in both ends of the another edge of the slant board, respectively;
grooves in the shape of a slit for containing each of the protrusions are formed in the fixed hinge unit; and
the another edge of the slant board is slid and rotated in the fixed hinge unit.

12. A personal portable communication device comprising:
a main part;
a slide part vertically sliding on the main part;
a slide hinge unit including a plate installed in the rear of the slide part and a guide unit longitudinally disposed in both sides of the plate;
a fixed hinge unit forming a hinge containing space installed in the front of the main part and downwardly opened;
a lift hinge unit including a slide guide groove installed in lower ends of the hinge containing space based on a horizontal axis to be rotated and rotated in the hinge containing space to guide a slide of the guide unit and a lift sideboard, formed in the shape of a fan, on a side on the horizontal axis; and
a stop member selectively engaged to the lift hinge unit and fastening the lift hinge unit to the fixed hinge unit, wherein, when the slide part is open, the lift hinge unit is rotated to the fixed hinge unit and raises the slide part to slant towards the main part, and the stop member maintains the raised lift hinge to be stopped.

13. The personal portable device of claim 12, wherein a space for allowing a movement of the lift sideboard is provided in the front of the main part.

14. The personal portable device of claim 12, wherein:
two stop holes corresponding to an end point of a track of the lift hinge unit are formed in the lift sideboard;
a stop lever selectively engaged to the stop hole is installed in the stop member; and
the stop lever is installed in the fixed hinge unit to be rotated such that a part of an end of the stop lever is inserted into the stop hole and another end of the stop lever is elastically supported by a spring.

15. The personal portable device of claim 14, wherein:
the stop lever is formed in the shape of stairs and installed in the top of the fixed hinge unit to be rotated; and
a protrusion is formed in the end corresponding to the stop hole and bonded to the stop hole.

16. The personal portable device of claim 12, wherein:
a slant board for blocking a gap between the lift hinge unit and the fixed hinge unit is provided;
both ends of a edge of the slant board are installed in the lift hinge unit to be rotated;
both ends of another edge opposite to the edge are installed in the fixed hinge unit to be slid and rotated; and
the lift hinge unit is raised from the fixed hinge unit and the slant board blocks a gap between the lift hinge unit and the fixed hinge unit.

17. The personal portable device of claim 16, wherein:
a protrusion outwardly protruded is formed in the both ends of the other edge of the slant board;
a groove in the shape of a slit for containing the protrusion is formed in the fixed hinge unit; and
the other edge of the slant board is slid and rotated in the fixed hinge unit.

* * * * *

UNITED STATES PATENT AND TRADEMARK OFFICE
CERTIFICATE OF CORRECTION

PATENT NO.       : 7,599,487 B2                                          Page 1 of 1
APPLICATION NO.  : 11/479567
DATED            : October 6, 2009
INVENTOR(S)      : Yong Ho Lim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 609 days.

Signed and Sealed this

Twenty-eighth Day of September, 2010

David J. Kappos
*Director of the United States Patent and Trademark Office*